United States Patent
Randall et al.

(10) Patent No.: US 10,538,041 B2
(45) Date of Patent: Jan. 21, 2020

(54) TIRE CURING BLADDER WITH AN AIR BARRIER LAYER

(71) Applicant: Bridgestone Americas Tire Operations, LLC, Nashville, TN (US)

(72) Inventors: Amy M. Randall, Brentwood, TN (US); Craig R. Balnis, Akron, OH (US); David J. Zemla, Canal Fulton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 123 days.

(21) Appl. No.: 15/814,750

(22) Filed: Nov. 16, 2017

(65) Prior Publication Data

US 2018/0133985 A1 May 17, 2018

Related U.S. Application Data

(60) Provisional application No. 62/423,341, filed on Nov. 17, 2016.

(51) Int. Cl.
*B29D 30/06* (2006.01)
*B29C 73/02* (2006.01)
*B29C 33/56* (2006.01)

(52) U.S. Cl.
CPC ........ *B29C 73/025* (2013.01); *B29D 30/0654* (2013.01); *B29C 33/56* (2013.01); *B29D 2030/0655* (2013.01)

(58) Field of Classification Search
CPC ........ B29D 30/0654; B29D 2030/0655; B29C 73/025; B29C 37/0067; B29C 33/56
See application file for complete search history.

(56) References Cited

U.S. PATENT DOCUMENTS

| 2,338,620 A * | 1/1944 | Bryant | B29C 73/325 156/156 |
| 7,896,633 B2 * | 3/2011 | Agostini | B29C 33/505 249/65 |
| 8,323,014 B2 * | 12/2012 | Lo Presti | B29C 43/3642 425/52 |

(Continued)

FOREIGN PATENT DOCUMENTS

| CN | 102585733 | 9/2013 |
| CN | 102634300 | 6/2014 |
| WO | 2015019138 | 2/2015 |

OTHER PUBLICATIONS

Okel et al.; A Materials Approach to Fuel-Efficient Tires; Project ID # VS0884; May 18, 2012.

(Continued)

*Primary Examiner* — James P Mackey
(74) *Attorney, Agent, or Firm* — Meredith E. Hooker; Arthur Reginelli

(57) ABSTRACT

A method of manufacturing a tire curing bladder, the method includes the steps of (i) providing a cured tire curing bladder; and (ii) applying an air barrier composition to the cured tire curing bladder to form an air barrier layer. A method of restoring the air retention of a tire curing bladder, the method includes the steps of (i) providing a used tire curing bladder; and (ii) applying an air barrier composition to the used tire curing bladder to form an air barrier layer.

19 Claims, 2 Drawing Sheets

(56) References Cited

U.S. PATENT DOCUMENTS 8,506,276 B2 * 8/2013 Tanno .................... B29C 33/64
156/123

OTHER PUBLICATIONS

Martin et al.; A Materials Approach to Fuel-Efficient Tires; Project ID # VS0884; Jun. 19, 2014.
Kornish et al.; Final Technical Report for DOE/EERE (Materials Approach to Fuel-Efficient Tires); DE-EE0005359; Apr. 2, 2016.

* cited by examiner

TIRE CURING BLADDER WITH AN AIR BARRIER LAYER

This application claims the benefit of U.S. Provisional Application Ser. No. 62/423,341, filed on Nov. 17, 2016, which is incorporated herein by reference.

FIELD OF THE INVENTION

Embodiments of the present invention generally relate to a tire curing bladder comprising an air barrier layer. Embodiments of the present invention generally relate to methods of utilizing an air barrier composition to enhance the air retention properties of a tire curing bladder.

BACKGROUND OF THE INVENTION

Methods of manufacturing pneumatic tires generally include building a green tire upon an inflatable bladder. The green tire is then placed into a mold and cured while the green tire is subjected to pressure from a curing bladder. The former bladder is typically referred to as a tire building bladder while the later typically referred to as a tire curing bladder.

Tire building bladders are typically not subjected to significant stresses, and the primary design feature is often related to preventing adhesion between the bladder and the green tire components. Historically, these tire building bladders have been constructed from natural rubber, and the bladder is typically modified with a release coating or layer, such as those deriving from silicone oils or silicone rubbers.

On the other hand, tire curing bladders are subjected to significant stresses. During the curing process, the bladder, which is adapted to seat within the mold, is inflated inside the green tire. The green tire is therefore forced to flow into the mold, which thereby causes the tire to take on the configuration of the mold. The bladder is often also used to transfer heat to the green tire through a fluid, such as steam, that is circulated through the bladder. After the curing process, the bladder is deflated and the tire is removed from the mold. These bladders are therefore subjected to repeated cycles of inflation and deflation while undergoing severe conditions of heat and pressure. Moreover, to prevent the green rubber from adhering and curing to the bladder, release agents are applied to the bladder surface. To withstand the dynamic, thermal, and chemical conditions to which the bladder is subjected, tire curing bladders are often formed from butyl rubber formulations, which have high resistance to heat and chemical degradation while being very elastic. Nonetheless, the severity of the conditions and stresses experienced by the bladders has a deleterious impact on the bladders. For example, the surface of the bladder can become oxidized, which can result in the cracking of the surface. This can have a deleterious impact on the tire being cured because it introduces surface imperfections where the bladder contacts the tire. Also, where air or steam is released through holes within the bladder (from pinholes to catastrophic failure of the bladder), the tire can experience not only aesthetic damage, but structural damage as well. As a result, the service life of bladders can be relatively short.

There is therefore a need in the industry to extend the life of tire curing bladders.

SUMMARY OF THE INVENTION

One or more embodiments of the present invention provide a method of manufacturing a tire curing bladder, the method comprising the steps of (i) providing a cured tire curing bladder; and (ii) applying an air barrier composition to the cured tire curing bladder to form an air barrier layer.

Other embodiments of the present invention provide a method of restoring the air retention of a tire curing bladder, the method comprising the steps of (i) providing a used tire curing bladder; and (ii) applying an air barrier composition to the used tire curing bladder to form an air barrier layer.

Still other embodiments of the present invention provide a method of repairing a tire curing bladder, the method comprising the steps of (i) providing a damaged tire curing bladder; and (ii) applying an air barrier composition to the damaged tire curing bladder to form an air barrier layer.

Other embodiments of the present invention provide a tire curing bladder assembly comprising a cured tire curing bladder including a body and an air barrier layer disposed on the body.

DETAILED DESCRIPTION OF ILLUSTRATIVE EMBODIMENTS

Figure 1:
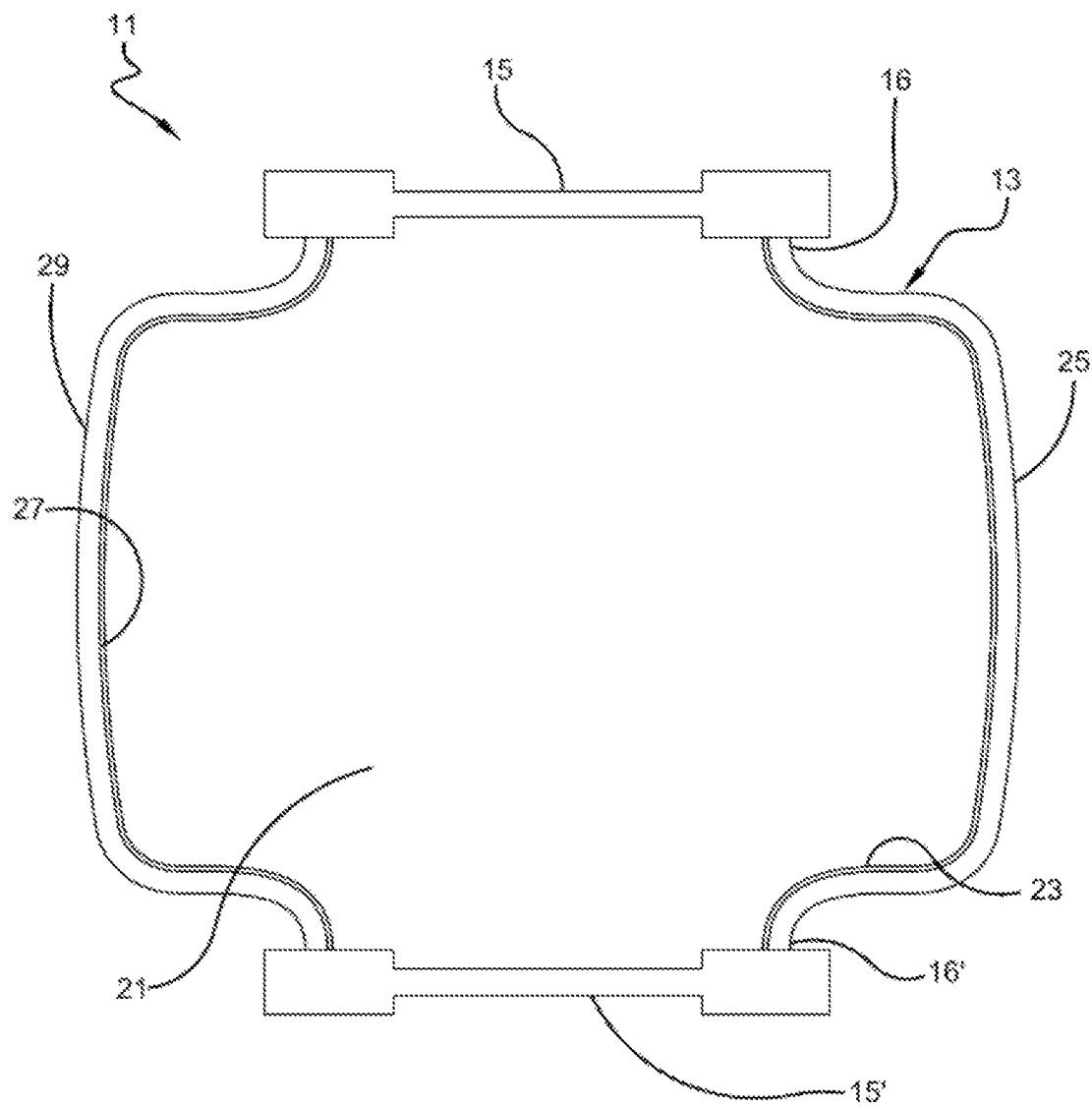
FIG. 1 is a cross-sectional view of a bladder according to one or more embodiments of the invention.

Embodiments of the present invention are based, at least in part, on tire curing bladders that include an air barrier layer. In one or more embodiments, an air barrier composition is applied to a surface of the tire curing bladder (e.g. inner surface) to thereby form an air barrier layer that enhances the air retention properties of the tire curing bladder, and also protects the bladder from the severe conditions experienced during the tire curing including oxidation. In other embodiments, an air barrier composition is applied to a used or serviced tire curing bladder to repair or otherwise extend the useful life of the tire curing bladder.

Tire Curing Bladder Structure

Aspects of the invention can be described with reference to the Figures, which show a tire curing bladder assembly 11, which may also be referred to as refreshed bladder apparatus 11. Assembly 11 includes a bladder 13 and a pair of opposed, spaced support members 15, 15' that mate with the longitudinal ends 16, 16', respectively, of bladder 13. Bladder 13 may be configured into a variety of shapes that generally range from a cylinder or tube shape, as shown in the Figures, to toroidal shapes and variations thereof. When expanded, bladder 13 generally takes on a toroidal shape. In one or more embodiments, a fluid, such as steam, may be introduced through and discharged into a void 21 formed by the expansion of bladder 13.

Figure 2:
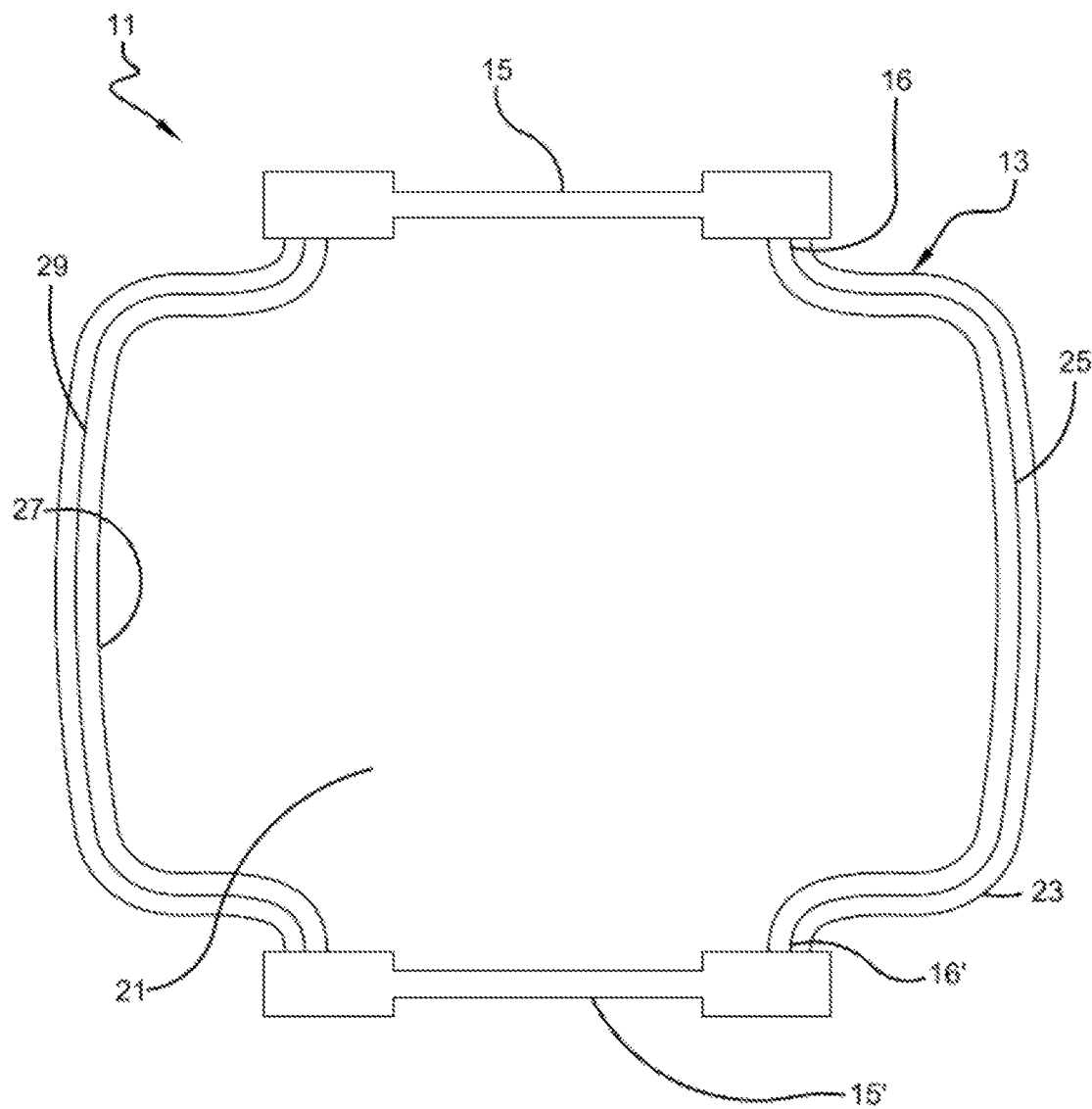
FIG. 2 is a cross-sectional view of a bladder according to one or more embodiments of the invention.

According to embodiments of the present invention, tire curing bladder 13 includes an air barrier layer 23 disposed upon body 25, which includes interior surface 27 and outer surface 29. As shown in FIG. 1, air barrier layer 23 is disposed on interior surface 27 of body 25. In other embodiments, as shown in FIG. 2, air barrier layer 23 may be disposed on the exterior surface 29 of body 25. In yet other embodiments, bladder 13 may include air barrier layers 23 disposed on both interior surface 27 and outer surface 29.

In one or more embodiments, air barrier layer 23 may extend over the entire (or over substantially the entire) interior surface 27 of body 25. For example, as shown in the Figures, air barrier layer 23 may extend from first longitudinal end 16, which is proximate to first support member 15, to second longitudinal end 16', which is proximate second support member 15'.

Tire Curing Bladder Body

Practice of one or more embodiments of the invention is not necessarily limited by the selection of any particular tire curing bladder as it pertains to the body (e.g. body 25). Generally speaking, the bladder body is a cured or vulcanized rubber body that derives from curing a vulcanizable rubber composition. As suggested above, the bladder and bladder body may have a variety of configurations and shapes, which configurations and shapes may depend on the type of tire being cured. Likewise, the bladder body may be formed from a variety of elastomeric formulations, some of which are described in U.S. Pat. Nos. 8,079,839; 8,100,678; 6,730,732; 6,702,912; 6,444,743; 6,292,993; 5,062,781; 5,019,318; 4,889,677; 4,721,446; 4,710,541; 4,533,305; and 3,947,540; and U.S. Publication Nos. 2012/0060992; 2015/0336342; 2015/0079211; 2013/0087953; 2012/0161365; 2009/0081323; 2008/0277815; and 2007/0194497; and Japanese Patent Application Laid-Open No. 2008-179676, which are all incorporated herein by reference.

In one or more embodiments, body 25 includes a single cured rubber layer, which is typically the cured or vulcanized rubber body. In other embodiments, body 25 includes multiple co-cured layers.

In one or more embodiments, body 25, or one or more layers of body 25, may be prepared from vulcanizable compositions that include a rubber, which may also be referred to as a vulcanizable rubber or elastomer, which may include those polymers that can be vulcanized to form compositions possessing rubbery or elastomeric properties. These elastomers may include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), poly(isobutylene), polysulfide rubber, acrylic rubber, urethane rubber, silicone rubber, epichlorohydrin rubber, and mixtures thereof. These elastomers can have a myriad of macromolecular structures including linear, branched, and star-shaped structures. These elastomers may also include one or more functional units, which typically include heteroatoms. In particular embodiments, a vulcanizable composition for forming the bladder body includes a blend of natural rubber and synthetic diene rubber such as polybutadiene. In other embodiments, a vulcanizable composition for forming the bladder body includes olefinic rubber such ethylene-propylene-diene rubber (EPDM).

In particular embodiments, the vulcanizable compositions for forming the bladder body include butyl rubber, which refers to a copolymer of isobutylene and conjugated diene monomer (e.g. isoprene). The skilled person appreciates that the diene units provide unsaturation to allow crosslinking. Other useful polymers include halogenated copolymers (e.g. brominated copolymers) of isobutylene and conjugated dienes, as well as copolymers of isobutylene and para-methylstyrene; E.P. Publ. No. 0,344,021, which is incorporated herein by reference, describes a preparation of useful halogenated butyl rubbers. As used herein, the term butyl rubber, unless otherwise specified, will refer to butyl rubber, as well as halogenated butyl rubbers (e.g. halogenated with chlorine or bromine such as for example chlorobutyl rubber and bromobutyl rubber), as well as brominated copolymers of isobutylene and para methylstyrene.

Additionally, the vulcanizable formulations that may be used to prepare the bladder bodies employed in the present invention may include fillers, curatives, antidegradants, cure activators, cure accelerators, cure retarders, halogen donors, oils, resins, plasticizers, pigments, fatty acids, zinc oxide, and peptizing agents.

Where the vulcanizable compositions include a filler, the filler may include one or more conventional reinforcing or non-reinforcing fillers. For example, useful fillers include carbon black, silica, alumina, and silicates such as calcium, aluminum, and magnesium silicates.

In one or more embodiments, carbon blacks include furnace blacks, channel blacks, and lamp blacks. More specific examples of carbon blacks include super abrasion furnace (SAF) blacks, intermediate super abrasion furnace (ISAF) blacks, high abrasion furnace (HAF) blacks, fast extrusion furnace (FEF) blacks, fine furnace (FF) blacks, semi-reinforcing furnace (SRF) blacks, medium processing channel blacks, hard processing channel blacks, conducting channel blacks, and acetylene blacks. Representative carbon blacks useful in one or more embodiments may include those designated by ASTM D1765 as N326, N330, N339, N343, N347, N351, N358, N550, N650, N660, N762, N772, and N774.

In particular embodiments, the carbon blacks may have a surface area (EMSA) of at least 20 $m^2/g$, in other embodiments at least 35 $m^2/g$, in other embodiments at least 50 $m^2/g$, in other embodiments at least 60 $m^2/g$; surface area values can be determined by ASTM D-1765 using the cetyltrimethylammonium bromide (CTAB) technique. In particular embodiments, vulcanizable compositions for forming the bladder body include carbon black filler having a surface area (EMSA) of from about 60 to about 110 $m^2/g$. The carbon blacks may be in a pelletized form or an unpelletized flocculent form. The preferred form of carbon black may depend upon the type of mixing equipment used to mix the rubber compound.

In one or more embodiments, the filler may include silica. When silica is used as a filler, the silica may be employed in conjunction with a coupling agent. In these or other embodiments, the silica may be used in conjunction with a silica dispersing agent.

A multitude of rubber curing agents (also called vulcanizing agents) may be employed, including sulfur or peroxide-based curing systems, as well resin-type curative and metal oxides. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. In particular embodiments, the curing agent is a metal oxide such as, but not limited to, zinc oxide and magnesium oxide. In these or other embodiments, resin curatives, such as phenolic-based resins, are employed. Useful phenolic-based resins include reactive resins, which typically contain a methylol group; these resins may also optionally be halogenated. Vulcanizing agents may be used alone or in combination. In one or more embodiments, the curatives are used in conjunction with a halogen donor compound. Many halogen donor compounds are known in the art including, but not limited to, poly(chloroprene) and zinc chloride.

Other ingredients that are typically employed in rubber compounding may also be added to the rubber compositions employed for fabricating the bladder body. These include oils, plasticizer, waxes, scorch inhibiting agents, processing aids, zinc oxide, tackifying resins, reinforcing resins, fatty acids such as stearic acid, and peptizers. In particular embodiments, the oils that are employed include those conventionally used as extender oils, which are described above. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

As the skilled person will appreciate, the bladder body can be fabricated by employing conventional techniques. For example, the vulcanizable formulation can be prepared into a green bladder by employing conventional rubber shaping and molding techniques. In particular embodiments, the vulcanizable composition can be extruded into a cylindrical shaped, cut to size, and then spliced into a toroidal shaped green bladder. The green bladder can then be cured by employing conventional curing techniques. In one or more embodiments, vulcanization can be effected by heating the vulcanizable composition within a mold. In one or more embodiments, the composition can be heated at an internal temperature from about 160° C. to about 210° C.

As will be described in greater detail below, the air barrier layer is applied after the bladder body has been cured or vulcanized.

In one or more embodiments, the thickness of body 25 may vary depending in the type of tire being cured by the bladder. For example, thinner gauge is employed for curing passenger tires, while thicker gauge is employed for off-road radial tires, with the thickness of the bladders for truck/bus and agricultural tires being there between. Where body 25 is used to cure passenger tire, body 25 may have a thickness of greater than 3 mm, in other embodiments greater than 4 mm, and in other embodiments greater than 5 mm. In these or other embodiments, body 25 may have a thickness of less than 12 mm, in other embodiments less than 10 mm, and in other embodiments less than 8 mm. In one or more embodiments, the thickness of body 25 is from about 3 to about 12 mm, in other embodiments from about 4 to about 10 mm, and in other embodiments from about 5 to about 8 mm.

In one or more embodiments, where body 25 is within a bladder used for off-road radial tires, the thickness of body 25 may be greater than 12 mm, in other embodiments greater than 15 mm, and in other embodiments greater than 18 mm. In these or other embodiments, body 25 may have a thickness of less than 40 mm, in other embodiments less than 30 mm, and in other embodiments less than 27 mm. In one or more embodiments, the thickness of body 25 is from about 12 to about 40 mm, in other embodiments from about 15 to about 30 mm, and in other embodiments from about 18 to about 25 mm.

Air Barrier Layer

In one or more embodiments, the air barrier layer (e.g. air barrier layer 23) may be generally described with respect to one or more properties of the air barrier layer.

The air barrier layer of one or more embodiments of the present invention (e.g. air barrier layer 23) generally includes a polymeric layer that has low permeability to air; i.e. low permeability to oxygen, nitrogen and carbon dioxide. The low permeability to air may be described in terms of the oxygen permeability ($P(O_2)$), which may also be referred to as oxygen permeance. The $P(O_2)$ number quantifies the amount of oxygen that can pass through the polymeric layer under a specific set of circumstances and is generally expressed in units of cc·mm/m²·day·atm. This is a standard unit of permeation measured as cubic centimeters of oxygen permeating through one millimeter thickness of a sample, of an area of a square meter, over a 24 hour period, under a partial pressure differential of one atmosphere at a specific temperature and relative humidity (R.H.) conditions. In one or more embodiments, the oxygen permeability ($P(O_2)$) may be measured in accordance with ASTM method F1927-14 which measures $O_2$ transmission rates at 23° C. at 50% relative humidity.

In one or more embodiments, the air barrier layer of the tires of the present invention (e.g. air barrier layer 23) may have a $P(O_2)$ of less than 500, in other embodiments less than 250, in other embodiments less than 150, in other embodiments less than 100, in other embodiments less than 80, and in other embodiments less than 50, cc·mm/m²·day·atm. In one or more embodiments, the air barrier layer may have a $P(O_2)$ of from about 0.01 to about 500 cc·mm/m²·day·atm, in other embodiments from about 0.1 to about 100 cc·mm/m²·day·atm, in other embodiments from about 50 to about 100 cc·mm/m²·day·atm, and in other embodiments from about 50 to about 80 cc·mm/m²·day·atm.

In one or more embodiments, the air barrier layer of the tires of the present invention (e.g. air barrier layer 23) may have advantageous adhesion to body 25. The adhesion may be measured by ASTM D903 or ASTM D1876.

In one or more embodiments, the air barrier layer may have an adhesion to body 25 of more than 5 N/mm, in other embodiments more than 10 N/mm, in other embodiments more than 15 N/mm, in other embodiments more than 30 N/mm, and in other embodiments more than 50 N/mm. In one or more embodiments, the air barrier layer may have an adhesion to the innerliner of from about 1 N/mm to about 50 N/mm, in other embodiments from about 5 N/mm to about 30 N/mm, and in other embodiments from about 5 N/mm to about 15 N/mm.

The air barrier layer of one or more embodiments of the present invention (e.g. air barrier layer 23) may be generally characterized with respect to the composition of the air barrier layer.

Practice of one or more embodiments of the invention is not necessarily limited by the selection of any particular air barrier composition for the air barrier layer. Various air barrier compositions are known for this particular purpose, as generally disclosed in U.S. Pat. Nos. 5,840,825; 6,309,757; 6,521,706; 7,730,919; 7,798,188; 7,905,978; 7,954,528; 7,976,666; 8,021,730; 8,534,331; and 8,835,592; and U.S. Publication Nos. 2008/0047646; 2009/0038727; 2008/0152935; 2010/0174032; and 2015/0368512, which are incorporated herein by reference.

In one or more embodiments, an air barrier composition may include two or more polymeric components, each having a distinct glass transition temperature ($T_g$). In one or more embodiments, the two or more polymeric components may be sufficiently blended to provide the blended composition with a glass transition temperature that is distinct from the glass transition temperatures of the two or more polymeric components. In one or more embodiments, the air barrier layer composition of one or more embodiments of the present invention includes at least one glass transition temperature ($T_g$) peak, from one component of the air barrier layer, of less than −20° C., in other embodiments, less than −30° C., and in other embodiments, less than −40° C. Glass transition temperature may be measured by differential scanning calorimetry. In these or other embodiments, the air barrier layer composition includes a second glass transition temperature ($T_g$) peak of greater than 0° C., in other embodiments, greater than 10° C., and in other embodiments greater than 20° C.

In one or more embodiments, an air barrier composition is a polymeric composition including a thermoplastic and elastomeric component. In one or more embodiments, the air barrier layer is phase-separated polymeric system wherein an elastomeric component is phase separated from a thermoplastic component (e.g. soft and hard domains). In certain embodiments, the thermoplastic component is dispersed within the elastomeric component. In other embodiments, the elastomeric component is dispersed within the thermoplastic component. In yet other embodiments, the thermoplastic component and the elastomeric component are co-continuous. An exemplary embodiment includes a first phase with a polyurethane and a second phase with a polysulfide elastomer, and in certain embodiments, the polyurethane provides the continuous phase while polysulfide forms the discontinuous phase.

In one or more embodiments, an air barrier layer may be formed from an air barrier coating composition that is an aqueous dispersion or latex. In one or more embodiments, this aqueous dispersion may include more than 10 wt % solids, in other embodiments more than 20 wt. % solids, in other embodiments more than 25 wt. % solids, in other embodiments more than 40 wt. % solids, and in other embodiments more than 45, wt. % solids. In one or more embodiments, an aqueous medium having a dispersion of one or more polymeric materials therein may include from about 10 to about 45 wt. % solids, in other embodiments from about 20 to about 40 wt. % solids, and in other embodiments from about 20 to about 25 wt. % solids.

In particular embodiments, the air barrier layer includes a blend of polyurethane and elastomeric polymer. As disclosed in U.S. Publ. No. 2010/0174032, which is incorporated herein by reference, the polyurethane may include a polyurethane wherein at least 30 wt % of the mer units derive from a meta-substituted aromatic material, such as a meta-substituted aromatic isocyanate. In these or other embodiments, as disclosed in U.S. Publ. No. 2015/0368512, which is incorporated herein by reference, these compositions may derive from aqueous dispersions of polyurethane, a polysulfide, and a curative such as magnesium oxide. In one or more embodiments, an air barrier composition can include aqueous dispersed polyurethanes. In one or more embodiments, an air barrier composition can include aqueous dispersed polyvinylidene chloride copolymers.

In one or more embodiments, the polyurethane can have reactive functional groups. As used here, a reactive functional group refers to an atom, group of atoms, functionality, or group having sufficient reactivity to form at least one covalent bond with another reactive group in a chemical reaction. For example, a polyurethane can include reactive functional groups that are reactive with themselves or with another component, such as a crosslinker. Examples of reactive functional groups include mercapto or thiol groups, hydroxyl groups, (meth)acrylate groups, carboxylic acid groups, amine groups, epoxide groups, carbamate groups, amide groups, urea groups, isocyanate groups (including blocked isocyanate groups), and combinations thereof.

In one or more embodiments, a polyurethane can be substantially free or completely free of reactive functional groups. As used here, the term substantially free means a polyurethane may contain less than 1000 parts per million (ppm), and completely free means less than 20 parts per billion (ppb), of reactive functional groups. In one or more embodiments, a polyurethane may include aqueous dispersed polyurethanes that are completely free of reactive functional groups.

In one or more embodiments, an air barrier composition may include thermoplastic polymer (e.g. polyurethane) in an amount of more than 5 wt. %, in other embodiments, more than 10 wt. %, and in other embodiments, more than 15 wt. %, based on the total solid weight of the air barrier composition. In one or more embodiments, an air barrier composition may include thermoplastic polymer in an amount of less than 75 wt. %, in other embodiments, less than 50 wt. %, in other embodiments, less than 35 wt. %, and in other embodiments, less than 20 wt. %, based on the total solid weight of the air barrier composition. In one or more embodiments, an air barrier composition may include thermoplastic polymer in an amount of from about 5 wt. % to about 75 wt. %, in other embodiments, from about 10 wt. % to about 50 wt. %, and in other embodiments, from about 10 wt. % to about 20 wt. %, based on the total solid weight of the air barrier composition. The weight % may be determined by standard gel permeation chromatography.

In one or more embodiments, an air barrier composition includes a polysulfide. The polysulfide may act as an elastomeric material in the air barrier layer. The term polysulfide refers to a polymer that contains one or more disulfide linkages (i.e. —[S—S]—) linkages, in the polymer backbone, and/or in the terminal or pendant positions on the polymer chain. A polysulfide polymer can have two or more sulfur-sulfur linkages. A polysulfide can also include a mixture of primary disulfides and higher rank polysulfides such as tri and tetra polysulfide linkages (S—S—S; S—S—S—S). Further, a polysulfide can include mercapto or thiol functional groups (an —SH group). For instance, a polysulfide can be represented by chemical formula (I)

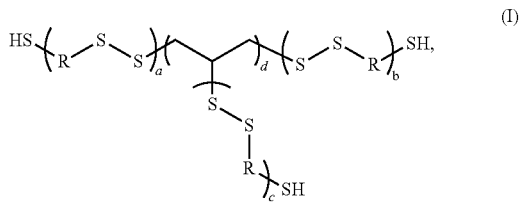

(I)

where each R can independently be —($CH_2$—$CH_2$—$CH_2$—O—$CH_2$—$CH_2$)— and a+b+c+d can be a number up to and including 1,000. A polysulfide that can be used with the present invention can also be represented by chemical formula (II):

H(SC$_2$H$_4$OCH$_2$OC$_2$H$_4$S)$_n$H        (II), where n can be a number up to and including 1,000. Exemplary polysulfides are those commercially available under the trade name THIOPLAST®, a liquid polysulfide polymer with mercapto end groups supplied by Akzo Nobel, Greiz, Germany.

In one or more embodiments, a polysulfide can have a glass transition temperature ($T_g$) of less than 0° C., as measured by differential scanning calorimetry. In other embodiments, a polysulfide can have a glass transition temperature ($T_g$) of less than −10° C., in other embodiments, less than −20° C., and in other embodiments, less than −30° C.

In one or more embodiments, an air barrier composition may be substantially free or may be completely free of all other elastomeric materials, except for polysulfides. As used here, the term substantially free means an air barrier composition may contain less than 1000 parts per million (ppm), and completely free means less than 20 parts per billion (ppb), of all other elastomeric materials, except for polysulfides.

In other embodiments, an air barrier composition may include a polysulfide and an additional elastomeric material. Exemplary additional elastomeric materials that can be used include acrylonitriles, natural and synthetic rubbers such as aqueous butyl rubber dispersions, styrenic thermoplastic elastomers, polyamide elastomers, thermoplastic vulcanizates, flexible acrylic polymers, and combinations thereof.

In one or more embodiments, an air barrier composition may include elastomeric polymer (e.g. polysulfide) in an amount of more than 5 wt. %, in other embodiments, more than 10 wt. %, in other embodiments, more than 15 wt. %, in other embodiments, more than 25 wt %, and in other embodiments, more than 50 wt. %, based on the total solid weight of the air barrier composition. In one or more embodiments, an air barrier composition may include elastomeric polymer in an amount of less than 80 wt. %, in other embodiments, less than 75 wt. %, and in other embodiments, less than 70 wt. %, based on the total solid weight of the air barrier composition. In one or more embodiments, an air barrier composition may include elastomeric polymer in an amount of from about 5 wt. % to about 80 wt. %, in other embodiments, from about 25 wt. % to about 75 wt. %, and in other embodiments, from about 50 wt. % to about 70 wt. %, based on the total solid weight of the air barrier composition. The weight % may be determined by standard gel permeation chromatography.

In one or more embodiments, an air barrier composition may include one or more inorganic materials. As used herein, an inorganic material refers to materials and substances that are not organic, i.e., do not include carbon-based materials. The one or more inorganic materials may include one or more platy inorganic fillers. As used herein, a platy inorganic filler refers to an inorganic material in the platy form. The term platy refers to a structure in which one dimension is substantially smaller than the two other dimensions of the structure resulting in a flat type appearance. The platy inorganic fillers are generally in the form of stacked lamellae, sheets, platelets, or plates with a relatively pronounced anisometry. The inorganic materials, such as the platy inorganic fillers, can further improve the barrier performance of the resulting air barrier layer by reducing the permeability of liquids and gases.

Suitable platy inorganic fillers can include those having a high aspect ratio. Suitable high aspect ratio platy inorganic fillers include, for example, vermiculite, mica, talc, wollastonite, chlorite, metal flakes, platy clays, and platy silicas. In one or more embodiments, a filler has a diameter of from 1 to 20 microns, in other embodiments, from 2 to 10 microns, and in other embodiments, from 2 to 5 microns. In one or more embodiments, the aspect ratio of the fillers can be at least 5:1, in other embodiments, at least 10:1, and in other embodiments, at least 20:1. For example, mica flakes may have an aspect ratio of 20:1, talc may have an aspect ratio of 10:1 to 20:1, and vermiculite may have an aspect ratio of from 200:1 to 10,000:1.

In one or more embodiments, as disclosed in U.S. Pat. No. 8,534,331, the air barrier layer includes a two-phase system where an elastomer is dispersed within a thermoplastic matrix. In certain embodiments, the thermoplastic may include nylon and the elastomer may include butyl rubber and/or a sulfur-curable diene based elastomer.

In one or more embodiments, an air barrier composition may include a rheology agent. As generally known to those skilled in the art, rheology agents are those materials that help to improve the flow properties of a composition. An exemplary rheology agent is a polypropylene glycol solution of a urea modified polyurethane In one or more embodiments, the air barrier layer of the tires of the present invention (e.g. air barrier layer 23) may have a thickness of more than 8 mils, in other embodiments more than 10 mils, in other embodiments more than 14 mils, and in other embodiments more than 16 mils. In these or other embodiments, the air barrier layer may have a thickness of less than 28 mils, in other embodiments less than 25 mils, in other embodiments less than 20 mils, and in other embodiments less than 18 mils. In one or more embodiments, the air barrier layer may have a thickness of from about 5 mils to about 28 mils, in other embodiments from about 8 mils to about 25 mils, in other embodiments from about 10 mils to about 22 mils, and in other embodiments from about 15 mils to about 20 mils.

In one or more embodiments, the composition of the air barrier layer is not sulfur crosslinked to an adjacent tire component. For example, in one or more embodiments, the composition of the air barrier layer is not sulfur crosslinked to the innerliner. In other embodiments, the composition of the air barrier layer is not sulfur crosslinked to the carcass.

In one or more embodiments, the composition of the air barrier layer is sulfur crosslinked to an adjacent tire component. For example, in one or more embodiments, the composition of the air barrier layer is sulfur crosslinked to the innerliner. In other embodiments, the composition of the air barrier layer is sulfur crosslinked to the carcass.

Method of Applying Air Barrier Composition

As indicated above, the air barrier layer associated with the tire curing bladders of this invention is applied to a surface of the bladder body after a cured tire curing bladder is provided. In other words, the air barrier layer is applied to a tire curing bladder that has undergone the vulcanization (i.e. curing) process associated with the manufacture of the tire curing bladder. In one or more embodiments, the air barrier layer is applied to an aged tire curing bladder.

Thus, once a cured tire curing bladder has been provided, the air barrier layer is applied to the tire curing bladder. The air barrier layer may be applied to the tire curing bladder by the direct application of a liquid or otherwise flowable composition (e.g., molten extrudate) that forms a wet or green coating that then dries or cures to form the air barrier layer. In other embodiments, the air barrier layer is applied through a transfer coating; i.e., a liquid or otherwise flowable composition that forms a wet or green coating is applied to a transfer substrate, such as a release member, the wet or green coating is allowed to dry or otherwise cure into a solids composition, and then the solids composition is applied to the tire curing bladder and the transfer substrate is removed.

As suggested by the drawings, in one or more embodiments, the air barrier layer may be applied directly to the inner surface of a tire curing bladder. In these or other embodiments, the air barrier layer may be applied directly to the outer surface of a tire curing bladder.

As the skilled person will appreciate, release agents, such as silicone or silicone-based compositions, may be used during the tire manufacturing process. As a result, practice of the present invention may include applying the air barrier layer to a layer or film of release agent on the exterior of a tire curing bladder. In other embodiments, efforts may be made to remove or otherwise treat the release agents prior to application of the air barrier layer on the exterior of a tire curing bladder. As a result, practice of the present invention may include application of the air barrier layer to a residue of a release agent; for example, a residue resulting from the chemical treatment of a release agent layer or film.

In one or more embodiments, an intermediary layer is disposed below the air barrier layer (i.e. between the air barrier layer and the bladder body). For example, an intermediary layer may include a primer layer or a release agent layer, or a combination thereof.

In one or more embodiments, a primer layer may be present where there is a desire to improve the adhesion of the air barrier layer to the bladder body. An exemplary primer layer may include a composition including butyl rubber, such as those disclosed in U.S. Pat. No. 5,985,981, which is incorporated herein by reference. In one or more embodiments, the air barrier layer is applied to a primer layer that is first applied to the surface of the bladder body. The primer layer serves to improve adhesion between the air barrier layer and the bladder body.

In those embodiments where the air barrier layer derives from a liquid or otherwise flowable composition, the composition may be applied directly to the tire curing bladder, or applied to a transfer member, by using a variety of techniques to form a wet or green coating layer. For example, the liquid or flowable composition may be applied by spraying, roll-coating, knife coating, extrusion, or similar techniques. In one or more embodiments, the air barrier composition has a viscosity that is low enough to allow the composition to be spray applied to the tire curing bladder.

Following application of the air barrier layer to the tire curing bladder, further steps may be taken to expedite drying or curing of the air barrier layer. In certain embodiments, the composite (i.e. tire curing bladder with air barrier layer) is allowed to air dry at standard conditions of temperature and pressure. In other embodiments, the composite is heated (e.g. to 100° C.-150° C.).

Where the air barrier layer is applied to the tire curing bladder via a transfer coating, the solids composition can be mated to the tire curing bladder by using standard techniques that may include, for example, mating the solids composition to the tire curing bladder and then applying pressure, such as by way of a roller.

INDUSTRIAL APPLICABILITY

As indicated above, practice of this invention may include applying an air barrier to a newly manufactured tire curing bladder or to a used or serviced tire curing bladder. Regarding the latter, a used or serviced tire curing bladder may include a bladder having degraded or inferior air retention properties.

In one or more embodiments, a used tire curing bladder may be characterized by the number of curing cycles that the tire curing bladder may have experienced. In one or more embodiments, a used tire curing bladder may have experienced at least 100 cycles, in other embodiments at least 200 cycles, and in other embodiments at least 300 cycles.

Various modifications and alterations that do not depart from the scope and spirit of this invention will become apparent to those skilled in the art. This invention is not to be duly limited to the illustrative embodiments set forth herein.

What is claimed is:

1. A method of manufacturing a tire curing bladder, the method comprising the steps of:
   (i) providing a cured tire curing bladder, wherein the cured tire bladder is a used tire curing bladder; and
   (ii) applying an air barrier composition to the cured tire curing bladder to form an air barrier layer.

2. The method of claim 1, wherein the used tire curing bladder includes a crack or a pinhole.

3. The method of claim 1, wherein the air barrier composition includes a phase separated blend of elastomer and thermoplastic resin.

4. The method of claim 1, the tire curing bladder having an interior surface and an exterior surface, wherein the step of applying is performed by spraying the air barrier composition onto the interior surface of the tire curing bladder.

5. The method of claim 1, the tire curing bladder having an interior surface and an exterior surface, wherein the step of applying is performed by spraying the air barrier composition onto the exterior surface of the tire curing bladder.

6. The method of claim 1, the tire curing bladder having an interior surface and an exterior surface, wherein the step of applying includes applying the air barrier composition to both the interior surface of the tire curing bladder and the exterior surface of the tire curing bladder.

7. The method of claim 1, wherein the step of applying forms a tire curing bladder having enhanced air retention properties, the method further comprising the step of utilizing the tire curing bladder having enhanced air retention properties to manufacture a tire.

8. A method of repairing a tire curing bladder, the method comprising the steps of:
   (i) providing a damaged tire curing bladder; and
   (ii) applying an air barrier composition to the damaged tire curing bladder to form an air barrier layer,
   wherein the step of applying forms a tire curing bladder having enhanced air retention properties, the method further comprising the step of utilizing the tire curing bladder having enhanced air retention properties to manufacture a tire.

9. The method of claim 8, wherein the air barrier layer includes a phase separated blend of elastomer and thermoplastic resin.

10. A tire curing bladder assembly comprising a cured tire curing bladder including a body and an air barrier layer disposed on the body, wherein the air barrier layer includes a phase separated blend of elastomer and thermoplastic resin.

11. The tire curing bladder assembly claim 10, the body having an interior surface and an outer surface, the air barrier layer being disposed on the interior surface.

12. The tire curing bladder assembly of claim 10, the body having an interior surface and an exterior surface, the air barrier layer being disposed on the exterior surface.

13. The tire curing bladder assembly of claim 10, the body having a first longitudinal end and a second longitudinal end, the air barrier layer extending from the first longitudinal end to the second longitudinal end.

14. The tire curing bladder assembly of claim 10, the tire curing bladder being a generally toroidal shape when expanded.

15. A method of manufacturing a tire curing bladder, the method comprising the steps of:
   (i) providing a cured tire curing bladder; and
   (ii) applying an air barrier composition to the cured tire curing bladder to form an air barrier layer, wherein the air barrier composition includes a phase separated blend of elastomer and thermoplastic resin.

16. The method of claim 15, the tire curing bladder having an interior surface and an exterior surface, wherein the step of applying is performed by spraying the air barrier composition onto the interior surface of the tire curing bladder.

17. The method of claim 15, the tire curing bladder having an interior surface and an exterior surface, wherein the step of applying is performed by spraying the air barrier composition onto the exterior surface of the tire curing bladder.

18. The method of claim 15, the tire curing bladder having an interior surface and an exterior surface, wherein the step of applying includes applying the air barrier composition to both the interior surface of the tire curing bladder and the exterior surface of the tire curing bladder.

19. The method of claim 15, wherein the step of applying forms a tire curing bladder having enhanced air retention properties, the method further comprising the step of utilizing the tire curing bladder having enhanced air retention properties to manufacture a tire.

\* \* \* \* \*